Patented May 8, 1934

1,958,102

UNITED STATES PATENT OFFICE 1,958,102

FUNGICIDE

Marion C. Goldsworthy, Washington, D. C.,
dedicated to the free use of the Government
and the People of the United States No Drawing. Application September 16, 1932,
Serial No. 633,466

1 Claim. (Cl. 167—16)

(Granted under the act of March 3, 1883, as
amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

My invention relates to the use of cupric oxide as a fungicide in the control of plant diseases. The cupric oxide must be in a finely ground state and combined with hydrated lime to form a compound or mixture to which a suitable spreader (calcium caseinate, glue); adhesive (colloidal clay) or insecticide (arsenates, nicotine sulphate) may be added. The combination may be used in a liquid, dust or paste form.

While I am aware of the excellent fungicidal value of the combination of copper sulphate and lime, commonly known as Bordeaux mixture, I am also aware of the injuries that may accompany the application of this combination to plant foliage and fruit and that these injuries may, at times, far surpass those resulting from the disease that is to be controlled.

The object of my invention is to provide a new and suitable fungicide that exerts a superior fungicidal efficiency and one that does not, in any way, injure the plants to be sprayed.

A further object is to furnish a material that in no way complicates the usual procedure for the preparation of spray fluids, dusts or pastes and one that is very reasonable in place and easily obtained.

My invention exerts a superior fungicidal toxicity and in no way has it proven deleterious to the plants sprayed. It mixes or combines readily with lime in a liquid spray to form a mixture to which may be added a spreader, insecticide or adhesive. It readily mixes with lime, insecticide or adhesive to form a suitable dust for dusting plants. It readily mixes with oils, paints, gums, resins and colloidal clays to form a suitable paste for painting open wounds of plants.

My invention has repeatedly proven toxic to the spores of the organisms causing brown rot of apples and peaches, apple scab, peach scab and apple bitter rot in laboratory tests and field experiments have proven its value in controlling peach scab, apple scab and brown rot of apple and peach.

My invention, by repeated tests on various plants has proven not to be toxic to the plants sprayed, dusted or painted.

While I prefer to use the following formulæ as liquid sprays, it is understood that I am not restricted to such a narrow range and any or all proportions of the ingredients may be used in these cases.

Example 1

Two pounds of finely ground cupric oxide; four pounds of hydrated lime; fifty gallons of water. Slack the lime to form milk of lime, add the finely ground cupric oxide and while agitating the liquid in the spray tank add slowly the above mixture. When well agitated, add a suitable spreader, adhesive or insecticide.

Example 2

Two pounds of finely ground cupric oxide; five pounds of colloidal clay (bentonite); four pounds of lime; fifty gallons of water; suitable insecticide. Mix the finely ground cupric oxide, bentonite and insecticide in a dry state and while the agitator of the spray tank is operating sift the dry mixture slowly into the tank containing the water. Be careful not to sift rapidly since lumping of the colloidal clay may occur. Add finally the lime as milk of lime.

While I prefer to use the following formula for a material suitable for dusting plants for the control of plant diseases, I am not restricted to the proportions, set out in the following example, to be used of the ingredients.

Example 3

One hundred pounds of finely ground hydrated lime; ten pounds of finely ground cupric oxide; to which may be added five pounds of lead arsenate, calcium arsenate or zinc arsenite or any other suitable insecticide; a spreader, such as calcium caseinate, at the rate of one pound to the hundred, an adhesive, such as bentonite clay or any colloidal clay, at the rate of five pounds per hundred.

Cupric oxide may also be used as an ingredient of a wound dressing in the treatment of large and small pruning or accidental wounds. Because of the small danger to the treated plants, due to the extreme insolubility of the material, there are few restrictions upon the nature and proportions of the other ingredients it may be combined with, except that it is safer to have some calcium oxide or carbonate present. For this purpose cupric oxide may be combined with tars, oils, greases, fats or waxes natural or artificial (synthetic), gums, resins, drying oils and paints. Various insecticides may be also added to these pastes if so desired.

Although, in the examples given above, I have indicated certain formulæ in which my invention has been found useful and suitable to the protection of plants against fungous parasites without injury to the host, I do not by any means, restrict myself to them nor exclude myself from the use of other ingredients and proportions of the same and other spreaders, adhesives or insecticides or other fungicides.

I claim:

A fungicide comprising cupric oxide and lime.

MARION C. GOLDSWORTHY.